(12) United States Patent
Fujiyama

(10) Patent No.: US 8,302,722 B2
(45) Date of Patent: Nov. 6, 2012

(54) TWO-WHEELED MOTOR VEHICLE

(75) Inventor: Kotaro Fujiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/389,729

(22) PCT Filed: Jul. 5, 2010

(86) PCT No.: PCT/JP2010/004373
§ 371 (c)(1),
(2), (4) Date: Feb. 9, 2012

(87) PCT Pub. No.: WO2011/024368
PCT Pub. Date: Mar. 3, 2011

(65) Prior Publication Data
US 2012/0145470 A1    Jun. 14, 2012

(30) Foreign Application Priority Data
Aug. 25, 2009    (JP) .................................. 2009-194735

(51) Int. Cl.
B62D 11/00    (2006.01)
(52) U.S. Cl. ....................................................... 180/219
(58) Field of Classification Search .................. 180/225, 180/68.3; 123/184.21, 198 E; 55/385.3
See application file for complete search history.

(56) References Cited

U.S. PATENT DOCUMENTS

| 2001/0030071 A1* | 10/2001 | Okuma ......................... 180/219 |
| 2006/0065457 A1* | 3/2006 | Miyabe et al. ................. 180/219 |
| 2008/0230030 A1* | 9/2008 | Kawai et al. ............. 123/184.21 |
| 2009/0242305 A1* | 10/2009 | Asano ........................... 180/219 |

FOREIGN PATENT DOCUMENTS

| JP | 64-53055 A | 3/1989 |
| JP | 1-208559 A | 8/1989 |
| JP | 5-26124 A | 2/1993 |
| JP | 2003-336553 A | 11/2003 |
| JP | 3466043 B2 | 11/2003 |

* cited by examiner

Primary Examiner — Tashiana Adams
(74) Attorney, Agent, or Firm — Birch, Stewart, Kolasch & Birch, LLP

(57) ABSTRACT

An air cleaner case whereby a seat height can be reduced and the air cleaner case can be disposed in proximity to an engine. In a two-wheeled motor vehicle having a vehicle body frame, a fuel tank disposed at a front upper side of the vehicle body frame, a seat disposed behind the fuel tank and above the vehicle body frame, an engine suspended between the lower side of the fuel tank and the lower side of the vehicle body frame, an air cleaner case, a plate-like element disposed in the air cleaner case, and a maintenance lid used when the plate-like element is mounted/dismounted, the air cleaner case is disposed below the fuel tank, the plate-like element is disposed to be tilted rearward and upward in side view of the vehicle, and the maintenance lid is provided below the seat so as to face the seat.

20 Claims, 10 Drawing Sheets

TWO-WHEELED MOTOR VEHICLE

TECHNICAL FIELD

The present invention relates to a two-wheeled motor vehicle having an air cleaner case.

BACKGROUND ART

There has been hitherto known an air-intake apparatus for a two-wheeled motor vehicle in which an air cleaner case is disposed below a seat, a detachable maintenance lid (air cleaner cover) is provided below the seat and on the upper surface of the air cleaner case and a plate-like element is inserted vertically from the maintenance lid to the air cleaner case and fixed in a vertical position (for example, see Patent Document 1).

PRIOR ART DOCUMENT

Patent Document

Patent Document 1: Japanese Patent Publication No. 3466043

SUMMARY OF THE INVENTION

Problem to be solved by the Invention

However, with respect to the conventional air cleaner case, the element is fixed in a vertical position, and thus in order to secure the area of the element, the element must be elongated, so that it is necessary to design the air cleaner case in a large size in the height direction thereof. Therefore, it is difficult to reduce the seat height, and also it is difficult to dispose the large-size air cleaner case in proximity to an engine. Therefore, it has been difficult that the air-intake apparatus is disposed in proximity to the engine to enhance the engine characteristic.

The present invention has been implemented in view of the foregoing situation, and has an object to miniaturize an air cleaner case compact in a two-wheeled motor vehicle so that the height of a seat can be reduced and also the air cleaner case can be disposed in proximity to an engine.

Means of solving the Problem

In order to solve the above problem, according to the present invention, a two-wheeled motor vehicle having a vehicle body frame for holding a front wheel so that the front wheel is steerable, and holding a rear wheel so that the rear wheel is swingable, a fuel tank disposed at a front upper side of the vehicle body frame, a seat disposed behind the fuel tank and above the vehicle body frame, an internal combustion engine suspended between the lower side of the fuel tank and the lower side of the vehicle body frame, an air cleaner case for cleaning intake outside air and supplying the air to the internal combustion engine, a plate-like element disposed inside the air cleaner case, and a maintenance lid that constitutes a part of the air cleaner case and used when the plate-like element is mounted/dismounted, is characterized in that the air cleaner case is disposed below the fuel tank, the plate-like element is disposed to be tilted rearward and upward in a side view of the vehicle so that a cleaning face thereof faces an up-and-down direction, and the maintenance lid is provided below the seat so as to face the seat.

According to this construction, the plate-like element is disposed to be tilted rearward and upward, and thus the size of the plate-like element does not affect the size in the height direction of the air cleaner case, so that the air cleaner case can be compactly arranged in the height direction. Therefore, the air cleaner case can be disposed in proximity to the engine and also the seat height can be reduced. Furthermore, the maintenance lid is provided so as to face the seat behind the fuel tank. Therefore, even when the air cleaner case is disposed in proximity to the engine, the fuel tank does not hinder, and also the plate-like element can be mounted/dismounted from the seat side for maintenance. Still furthermore, only the space which the maintenance lid faces is formed below the seat, and thus the seat height can be reduced and thus the steering performance of the two-wheeled motor vehicle can be enhanced.

In the above construction, the air cleaner case may be constructed by two upper and lower divisional cases, an opening for a connecting tube for supplying intake air to the internal combustion engine may be formed in an upper air cleaner case, an opening for an air intake duct for introducing outside air into the air cleaner case may be formed in a lower air cleaner case, and the plate-like element and the maintenance lid may be arranged in the lower air cleaner case.

In this case, the plate-like element is disposed in the lower air cleaner case of the vertically dual-partitioned air cleaner. Therefore, when the plate-like element is mounted or dismounted, dust adhering to the plate-like element can be prevented from dropping to the upper air cleaner case side, that is, the clean side, and thus the maintenance performance can be enhanced. Furthermore, the maintenance lid is disposed at the lower air cleaner side, that is, the dirty side to which outside air is introduced, and thus the air-tightness between the maintenance lid and the lower air cleaner case can be relatively easily managed, so that the productivity can be enhanced.

Furthermore, an element holder may be interposed between divisional faces of the upper air cleaner case and the lower air cleaner case, and an element guide portion for holding the plate-like element may be formed at a lower portion of the element holder.

In this case, when the plate-like element is inserted from the maintenance lid, the element guide portion of the element holder can be used, and thus the mounting/dismounting performance of the plate-like element can be enhanced.

Furthermore, the element guide portion may be formed at a lower side of a position at which the plate-like element is fixed, a lid-side guide portion projecting to the inside of the air cleaner case may be formed in the maintenance lid, and the lid-side guide portion may be formed so as to push up the plate-like element to a fixing position under the state that the maintenance lid is fixed to the air cleaner case.

In this case, when the maintenance lid is fixed to the air cleaner case, the plate-like element is pushed up by the lid-side guide portion and the plate-like element is also fixed at the same time, so that the maintenance performance can be enhanced. Furthermore, when the maintenance lid is detached, the plate-like element can drop till the position of the element guide portion by its own weight, so that the plate-like element can be easily pulled out.

Furthermore, the maintenance lid may have a hook portion at an upper portion thereof, and have a fastening portion at a lower portion thereof.

In this case, the hook portion is provided at the upper portion, and the upper portion is not fixed by fastening or the like. Therefore, the maintenance lid can be secured to the air cleaner case while turned with the upper portion thereof being used as a fulcrum, so that the plate-like element can be lifted up by the lid-side guide portion and the plate-like element can be pushed up till the fixing position. Furthermore, the hook portion is provided to the upper portion of the maintenance lid, and thus it is unnecessary to provide a fastening part to the upper portion. Therefore, the number of fastening parts can be reduced, so that the productivity can be enhanced and the weight can be reduced.

Furthermore, all case-side fastening portions for fixing the air cleaner case to the vehicle body frame may be formed in the upper air cleaner case, and a frame-side fastening portion at the side of the vehicle frame to which the air cleaner case is fixed may be disposed on the upper surface of the vehicle body frame.

In this case, all the case-side fastening portions of the air cleaner case to the vehicle body frame are formed integrally with the upper air cleaner case. Therefore, the position precision of each case-side fastening portion can be enhanced, and the productivity can be enhanced. Furthermore, the air cleaner case is assembled by tightening the case-side fastening portions from the upper side of the vehicle body frame, so that the assembling work can be facilitated and thus the productivity can be further enhanced.

Furthermore, the wall portion of the upper air cleaner case facing the connecting tube which is connected to the connecting tube opening may be designed in a spherical shape.

In this case, the wall portion of the upper air cleaner case on which the air intake negative pressure of the engine acts is formed in a spherical shape and thus the rigidity of the wall portion is increased, so that air intake sound can be reduced.

Furthermore, the vehicle body frame may be constructed by at least a pair of right and left frame members, and the fuel tank may have a rear fastening portion that is formed in an arch-like shape in back view at a rear portion thereof, and may be fixed to the pair of right and left frame members through both the end portions in the vehicle width direction of the rear fastening portion.

In this case, the arch-like rear fastening portion is provided to the rear portion of the fuel tank, and thus the space in which the maintenance lid is disposed can be secured at the rear side of the fuel tank. Furthermore, the rear fastening portion functions as a member for connecting a pair of right and left frame members, and thus the strength and rigidity of the frame members can be enhanced.

Effect of the Invention

In the two-wheeled motor vehicle according to the present invention, the plate-like element is disposed to be tilted to the rear and upper side and thus it does not affect the size in the height direction of the air cleaner case. Therefore, the air cleaner case can be compactly disposed in the height direction. Accordingly, the air cleaner case can be disposed in proximity to the engine, and also the seat height can be reduced. Furthermore, the maintenance lid is provided so as to face the seat. Therefore, even when the air cleaner case is disposed in proximity to the engine, the fuel tank does not hinder, and the plate-like element can be mounted/dismounted from the seat side to perform maintenance. Furthermore, only the space which the maintenance lid faces is formed below the seat, and thus the steering performance of the two-wheeled motor vehicle can be enhanced by reducing the seat height.

Furthermore, the plate-like element is disposed in the lower air cleaner case. Therefore, dust adhering to the plate-like element can be prevented from dropping off to the clean side at the upper air cleaner case side, and thus the maintenance performance can be enhanced. Furthermore, the maintenance lid is disposed at the lower air cleaner case side as the dirty side, and thus the air-tightness between the maintenance lid and the lower air cleaner case can be relatively easily managed, so that the productivity can be enhanced.

Furthermore, the plate-like element can be inserted by using the element guide portion of the element holder, so that the mounting/dismounting performance of the plate-like element can be enhanced.

Still furthermore, when the maintenance lid is fixed, the plate-like element is pushed up by the lid-side guide portion, and fixed at the same time, so that the maintenance performance can be enhanced. When the maintenance lid is detached, the plate-like element can drop till the position of the locating position of the element guide portion by its own weight, so that the plate-like element can be easily pulled out.

Furthermore, the maintenance lid can be secured to the air cleaner case while the upper portion of the maintenance lid is turned with the upper portion thereof being used as a fulcrum, and the plate-like element can be pushed up till the fixing position by lifting the plate-like element with the lid-side guide portion. Furthermore, the hook portion is provided to the upper portion of the maintenance lid, so that it is unnecessary to provide a fastening part to the upper portion and the number of fastening parts can be reduced. Therefore, the productivity can be enhanced, and the weight can be reduced.

All the case-side fastening portions of the air cleaner case to the vehicle body frame are formed integrally with the upper air cleaner case, so that the position precision of each case-side fastening portion can be enhanced and the productivity can be enhanced. Furthermore, the air cleaner case is assembled by tightening the case-side fastening portions from the upper side of the vehicle body frame, so that the assembling work can be easily performed and the productivity can be enhanced.

Furthermore, the wall portion of the upper air cleaner case on which the air intake negative pressure of the engine acts is formed in a spherical shape, and thus the rigidity of the wall portion is increased, so that the air intake sound can be reduced.

Still furthermore, the arch-shaped rear fastening portion is provided to the rear portion of the fuel tank, and thus the space in which the maintenance lid is disposed can be secured at the rear side of the fuel tank. Furthermore, the rear fastening portion functions as a member for connecting the pair of right and left frame members, whereby the strength and rigidity of the frame members can be enhanced.

BEST MODE FOR CARRYING OUT THE INVENTION

A vehicle according to an embodiment of the present invention will be described with reference to the drawings.

In the following description, the up-and-down, front-and-rear and right-and-left directions are defined with respect to a direction along which a driver of the vehicle views.

Figure 1:
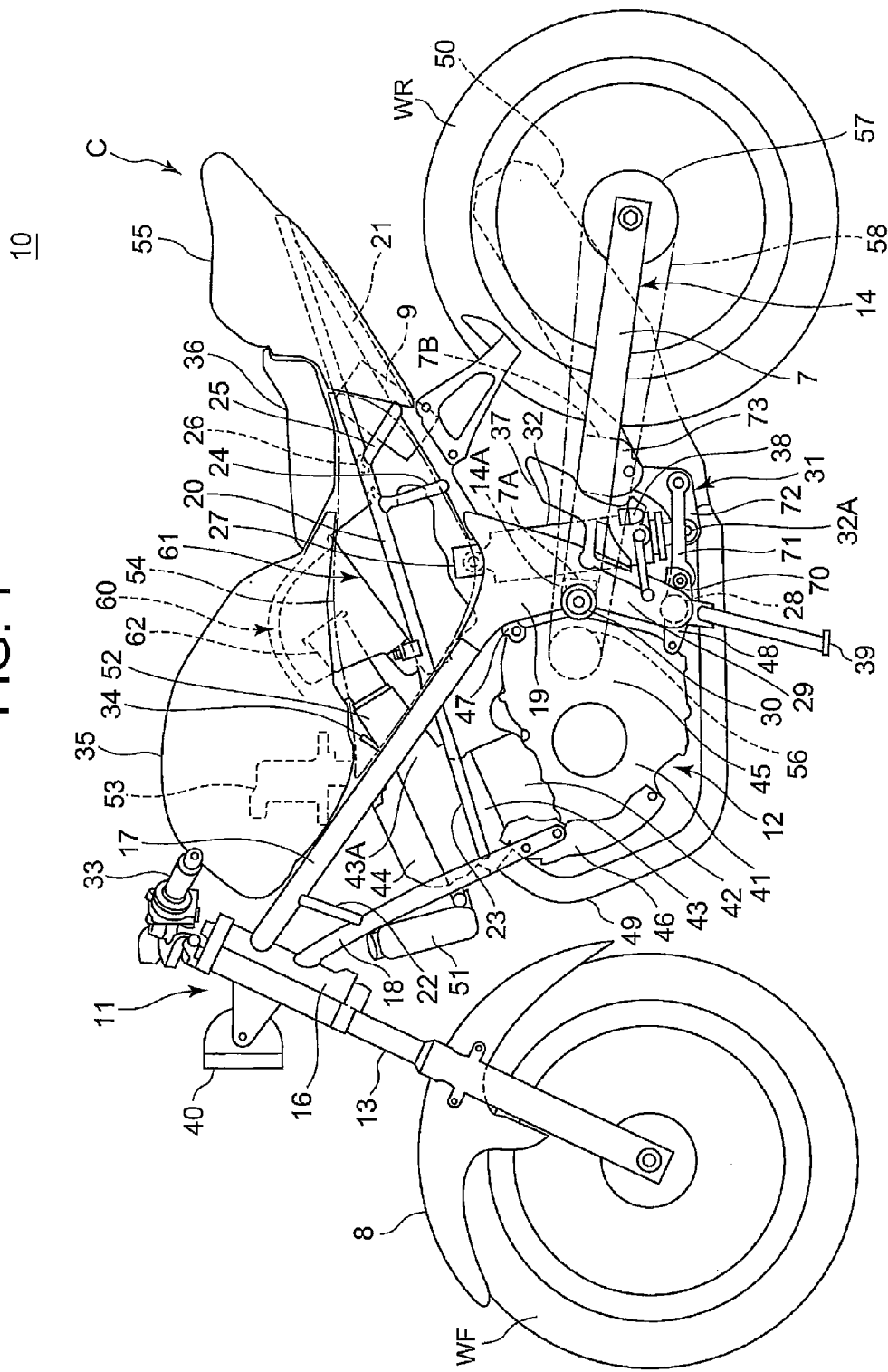
FIG. 1 is a left side view of a two-wheeled motor vehicle according to an embodiment of the present invention.

FIG. 1 is a left side view of a two-wheeled motor vehicle 10 according to an embodiment of the present invention.

The two-wheeled motor vehicle 10 is a saddle riding type vehicle in which an engine 12 (internal combustion engine) is disposed at the center portion of a vehicle body frame 11, a front fork 13 is supported at the front end of the vehicle body frame 11 so as to be steerable, and a swing arm 14 which is swingable in the up-and-down direction is mounted at the lower portion of the rear end of the vehicle body frame 11.

The vehicle body frame 11 is configured to have a head pipe 16 for supporting the front fork 13 so that the front fork 13 is steerable, a pair of right and left main frames 17 extending from the upper portion of the head pipe 16 downward and backward, a pair of right and left down frames 18 extending from the lower portion of the head pipe 16 downward and backward, a pair of right and left center frames 19 extending from the rear ends of the main frames 17 downwards at an intermediate portion of the vehicle in the front-and-rear direction, a pair of right and left seat rails 20 (frame members) which extend backward and upward from the rear portions of the main frames 17 to the rear portion of the vehicle, a pair of right and left sub frames 21 for connecting the rear ends of the upper portions of the main frames 17 and the rear ends of the seat rails 20, and a swing arm 14.

Enforcing frames 22 and 23 for connecting the main frames 17 and the down frames 18 are provided at the rear side of the head pipe 16 and the sides of the engine 12. Furthermore, enforcing frames 24 and 25 for connecting the seat rails 20 and the sub frames 21 are provided at the rear sides of the center frames 19. The respective enforcing frames 22, 23, 24, 25 are provided as right and left pairs.

A seat lower cross member 26 for connecting the right and left seat rails 20 is provided at an intermediate portion of the seat rails 20. An upper cross member 27 for connecting the right and left center frames 19 is provided to the upper portions of the center frames 19, and a lower cross member 28 for connecting the lower portions of the right and left center frames 19 is provided to the lower portions of the center frames 19.

The right and left center frames 19 have plate-like pivot portions 29 extending downwardly from the upper portion at which the main frames 17 and the seat rails 22 are connected. The pivot portions 29 are provided as a pair of right and left pivot portions, and a pivot shaft 30 for pivotally supporting the swing arm 14 so that the swing arm 14 is swingable is disposed so as to penetrate through the intermediate portions of the right and left pivot portions 29 in the up-and-down direction. The pivot shaft 30 is disposed in parallel to the vehicle width direction.

The swing arm 14 has a pair of right and left arms 7 extending in the front-and-rear direction, and the right and left arms 7 are connected to each other by a front cross portion 7A provided at the front side and a rear cross portion 7B provided at the front side of the rear wheel WR.

A pivot shaft 30 penetrates through the front end portion 14A of the swing arm 14, and the swing arm 14 extends backwardly with the front end portion 14A thereof being located at the swing center. The rear wheel WR as a driving wheel is mounted on the rear end of the swing arm 14.

A link mechanism 31 which is joined to the lower cross member 28 is joined to the lower portion of the swing arm 14. A rear cushion 32 which elastically supports the swing arm 14 is joined to the upper cross member 27 at the upper end thereof, and also joined to the link mechanism 31 at the lower end thereof. The rear cushion 32 passes through the gap between the front cross portion 7A and the rear cross portion 7B of the swing arm 14 so as to extend in the up-and-down direction.

A steering handle 33 is secured to the upper portion of the front fork 13, and a front wheel WF is secured to the lower portion of the front fork 13. A fuel tank 35 in which fuel is stocked is disposed at the upper side of the main frames 17 so as to straddle the right and left main frames 17 and extends from the rear side of the head pipe 16 to the upper side of the center frames 19. That is, the fuel tank 35 is disposed at the upper side of the front portion of the vehicle body frame 11. Furthermore, the fuel tank 35 contains a fuel pump 53 for supplying fuel to the engine 12.

A rider seat 36 which is provided so as to straddle the right and left seat rails 20 is disposed at the upper side of the seat rails 20 so as to be continuous with the rear end of the fuel tank 35, and extends backwards along the seat rails 20. The seat 36 is locked by a lock mechanism (not shown) provided to the rear portion of the seat 36, and a rider or the like releases the lock mechanism, whereby the lock mechanism is freely detachable. Furthermore, a battery 9 is disposed at a portion surrounded by the right and left seat rails 20 and the sub frames 21 below the rear portion of the seat 36.

Stays 37 are provided to the right and left center frames 19 so as to extend backwards from the rear portions of the pivot portions 29, and main steps 38 on which the rider steps are secured to the right and left stays 37.

Furthermore, a freely foldable side stand 39 is secured to the lower end of the left-hand center frame 19. The two-wheeled motor vehicle 10 has the side stand 39 at the left side, and thus when the vehicle is parked by using the side stand 39, it is parked while kept to be tilted to the left side at only a predetermined angle. A head lamp 40 is provided to the front portion of the head pipe 16.

The engine 12 is a water-cooling type four cycle single cylinder engine. A cylinder axial line is provided to be tilted forward, and the engine 12 is configured to have a cylinder block 42 in which a piston is slid, a cylinder head 43 and a cylinder head cover 44 which are successively provided in this order from the crank case 41 in which the crank shaft is mounted. A transmission 45 is provided at the rear portion of the crank case 41 so as to be integral with the crank case 41.

The engine 12 is supported on the vehicle body frame 11 so that a front hanger 46 joined to the front portion of the crank case 41 is fastened to the lower ends of the down frames 18, and the upper portion of the rear side of the crank case 41 is fastened to a rear hanger 47 extending from the upper portions of the center frames 19. Furthermore, the engine 12 is also fixed to the vehicle body frame 11 at the lower portion of the rear side thereof by a lower hanger 48 extending from the lower cross member 28. The engine 12 is hung while suspended to the lower side of the vehicle body frame 11 as a whole.

A drive sprocket 56 for outputting the rotation of the engine 12 is provided to the left side surface of the rear portion of the crank case 41. A driven sprocket 57 is provided to the left side surface of the rear wheel WR. The rear wheel WR is driven by a chain 58 wound between the drive sprocket 56 and the driven sprocket 57.

An exhaust pipe 49 is connected to the front portion of the cylinder head 43, and the exhaust pipe 49 extends from the front side of the crank case 41 through the lower side of the crank case 41 and to the rear side of the crank case 41. A muffler 50 extending to the upper rear side is connected to the rear end of the exhaust pipe 49.

Furthermore, a radiator 51 is secured to the front portion of the down frame 18.

An air-intake device 60 for taking in air to be supplied to the engine 12 is disposed below the rear portion of the fuel tank 35 and above the center frames 19.

The air-intake device 60 has a box-shaped air cleaner case 61 for cleaning intake outside air, and a connecting tube 62 protruding forward from the air cleaner case 61. A throttle body 52 for adjusting an air amount to be supplied to the engine 12 is connected to the front end of the connecting tube 62, and the throttle body 52 is connected to an air intake port 43A at the rear portion of the cylinder head 43. An injector 34 is provided to the throttle body 52, and fuel in the fuel tank 35 is supplied to the injector 34 by a fuel pump 53.

Furthermore, the air cleaner case 61 is located at the upper rear side of the cylinder head 43, and the connecting tube 62 and the throttle body 52 are linearly arranged to be tilted forward and downward to the air intake port 43A of the cylinder head 43.

The two-wheeled motor vehicle 10 has a vehicle body cover C formed of resin, and the vehicle body cover C has a pair of right and left side covers 54 covering both the sides of the air intake device 60, and a rear cover 55 covering the sub frames 21 and the seat rails 20 at the rear side of the seat 36. Specifically, the side covers 54 cover a side surface portion of the vehicle which is surrounded by the lower edges of the fuel tank 35 and the seat 36 and the upper edges of the main frames 17, the center frames 19 and the sub frames 21.

Furthermore, the upper portion of the front wheel WF is covered by a front fender 8 secured to the front fork 13.

Figure 2:
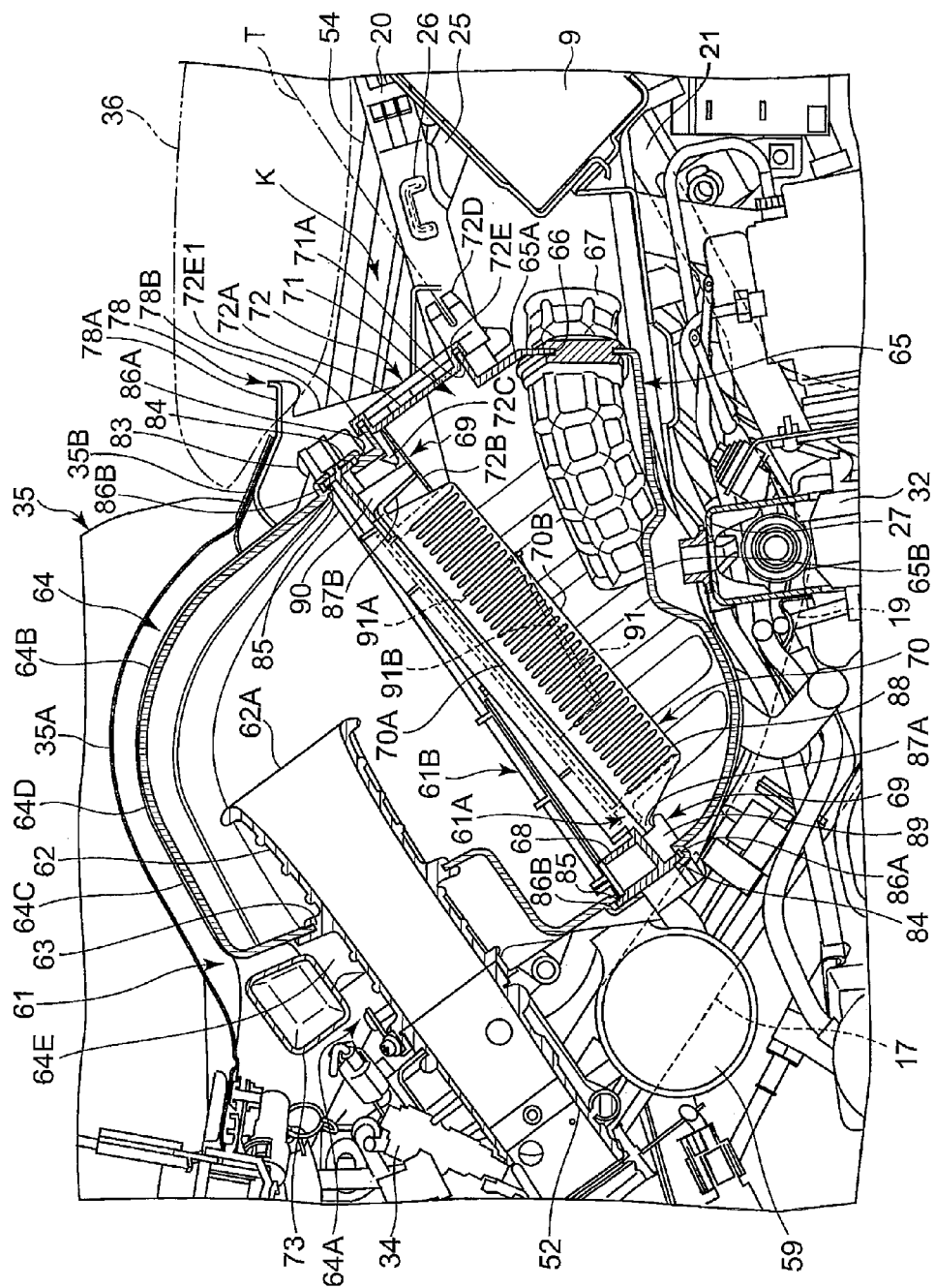
FIG. 2 is a side cross-sectional view showing an air-intake apparatus and the periphery thereof.

FIG. 2 is a side cross-sectional view showing the air intake device 60 and the periphery thereof.

As shown FIG. 2, the air cleaner case 61 is divided into upper and lower cases, and comprises a box-shaped upper air cleaner case 64 having an opened lower surface and a box-shaped lower air cleaner case 65 having an opened upper surface. The air cleaner case 61 is configured as a box-shaped case by assembling the upper air cleaner 64 and the lower air cleaner 65 so that the openings thereof are fitted to each other.

An opening 63 for a connecting tube to which the connecting tube 62 is connected is formed in the front portion of the upper air cleaner case 64. An opening 66 for an air-intake duct which is opened to the rear side of the vehicle is formed in a rear wall portion 65A of the lower air cleaner case 65, and an air-intake duct 67 as an air-intake port for introducing outside air into the air cleaner case 61 is connected to the opening 66 for the air-intake duct so as to protrude to the rear side. The air-intake duct 67 is formed in a tubular shape, and provided so as to protrude to the inside and outside of the lower air cleaner case 65 at the rear wall portion 65A of the lower air cleaner case 65.

The divisional faces 61A and 61B of the upper air cleaner case 64 and the lower air cleaner case 65 are formed to be substantially flat, and a plate-like element holder 68 is interposed between the divisional faces 61A and 61B. The element holder 68 is provided over the whole areas of the divisional faces 61A and 61B under the state that the element holder 68 is sandwiched between the lower surface of the upper air cleaner case 64 and the upper surface of the lower air cleaner case 65.

The element holder 68 has an element holding portion 69 at the lower surface side thereof, that is, inside the lower air cleaner case 65 under the state that it is assembled, and a plate-like element 70 for absorbing dust, etc. contained in outside air which is taken in from the air-intake duct 67 is held by the element holding portion 69. The plate-like element 70 has an upper cleaning face 70A and a lower cleaning face 70B formed on the upper and lower surfaces of the plate-like shape thereof, and the upper cleaning face 70a and the lower cleaning face 70B serve as surfaces having the maximum areas in the plate-like element 70. The plate-like element 70 is secured so that the upper cleaning face 70A is upwardly oriented to face the inside of the upper air cleaner case 64, and the lower cleaning face 70B is downwardly oriented to face the inside of the lower air cleaner case 65.

The element holder 68 is formed in a frame-like shape. All the outside air introduced from the air-intake duct 67 into the lower air cleaner case 65 flows from the lower cleaning face 70B into the plate-like element 70 to be cleaned, and then flows from the upper cleaning face 70A to the upper air cleaner case 64 side.

As described above, the air cleaner case 61 is partitioned into a dirty side and a clean side by the plate-like element 70. The dirty side serving as an outside air intake side corresponds to the lower air cleaner case 65, and the clean side through which cleaned air passes corresponds to the upper air cleaner case 64.

Furthermore, the element holder 68 is formed so as to decrease in plate thickness as the position is nearer to the rear end side thereof, and the lower surface side thereof at which the element holding portion 69 is formed is tilted rearward and upward with respect to the upper surface side thereof. Therefore, the plate-like element 70 is kept to be tilted rearward and upward with respect to the upper surface of the element holder 68.

A maintenance opening 71 through which the plate-like element 70 can be inserted into and removed from the lower air cleaner case 65 is formed in the rear wall portion 65A of the lower air cleaner case 65. A cylindrical fixing portion 71A projecting rearward is formed at the edge portion of the maintenance opening 71.

The maintenance opening 71 is formed above the air intake duct opening 66 in the rear wall portion 65A, and covered by a freely detachable maintenance lid 72.

The maintenance lid 72 has a plate-like lid portion 72A covering the maintenance opening 71, a lid-side guide portion 72B erected from the lid portion 72A to the inside of the maintenance lid 72, hook portions 72C hooked to the upper portion of the maintenance opening 71, lid fastening portions 72D (fastening portions) fastened to the lower air cleaner case 65, and groove portions 72E in which fixing portions 71A are fitted. The hook portions 72C are provided to the upper portion of the lid portion 72A, and the lid fastening portions 72D are provided to the lower portions of the lid portions 72A so as to face the hook portions 72C.

The upper air cleaner case 64 has a step portion 64A which is provided at the front end portion thereof so that the upper portion thereof is concaved to the back side by one step, and the opening 63 for the connecting tube is formed in the step portion 64A. The cylindrical connecting tube 62 penetrates through the opening 63 for the connecting tube, and disposed so as to project to the inside and outside of the upper air cleaner case 64 substantially in parallel to the lower surface of the upper air cleaner case 64. The front portion of the cylindrical connecting tube 62 is disposed to be set in the step portion 64A, and the rear end 62A thereof extends till an intermediate portion in the front-and-rear direction of the inside of the upper air cleaner case 64.

The rear end 62A of the connecting tube 62 is provided so as to face a rear wall portion 64B (wall portion) of the upper air cleaner case 64, and a portion of the rear wall portion 64B which faces the rear end 62A and a portion of the rear wall portion 64B which is continuous with an upper wall portion 64C have a spherical wall portion 64D which is formed to have a spherical curved surface. The wall portion facing the rear end 62A of the connecting tube 62 is a portion on which air-intake negative pressure of the engine 12 acts. In this embodiment, this wall portion is designed as the spherical wall portion 64D to be enhanced in strength and rigidity, and thus air-intake sound caused by vibration of the wall portion can be reduced.

The air cleaner case 61 is disposed under the state that it is tilted forward. Specifically, the air cleaner case 61 is disposed so that the connecting tube 62, the divisional faces 61A and 61B and the plate-like element 70 are rearward and upward tilted to the rear side of the vehicle, and the maintenance lid 72 is oriented to the upper side of the rear portion of the vehicle, that is, the maintenance lid 72 is oriented to the back surface side of the front portion of the seat 36. Furthermore, the plate-like element 70 is tilted rearward and upward at a larger tilt angle than the seat rail 20.

As described above, in this embodiment, the plate-like element 70 is disposed to be tilted rearward and upward (for example, tilted rearward and upward at 45° or less with respect to the horizontal direction), and thus the size of the plate-like element 70 does not greatly affect the size of the air cleaner case 61 in the height direction. Accordingly, the air cleaner case 61 can be disposed in proximity to the engine 12, and the air cleaner case 61 can be disposed in proximity to the engine 12 in accordance with a demand characteristic of the engine 12, so that the characteristic of the engine 12 can be enhanced.

Furthermore, the air cleaner case 61 is also disposed to be tilted forward in conformity with the forward tilted engine 12, and thus the connecting tube 62 and the throttle body 52 can be disposed linearly to be tilted forward to the air intake port 43A of the cylinder head 43 as shown in FIG. 1. Accordingly, the air intake resistance can be reduced and thus the air intake efficiency can be enhanced.

The air cleaner case 61 is provided so that the lower air cleaner case 65 is located between the right and left seat rails 20 above the center frame 19, and the upper portion thereof is disposed to be overlapped with the lower portion of the rear portion of the fuel tank 35 in side view as shown in FIG. 1. Specifically, as shown in FIG. 2, the upper portion of the air cleaner case 61 which is assembled to be tilted forward corresponds to the spherical wall portion 64D, and a curved-surface concaved portion 35A which is upwardly concaved so as to avoid the spherical wall portion 64D is formed at the lower portion of the fuel tank 35.

A concaved portion 65B is formed at the lower portion of the lower air cleaner case 65 so as to avoid the upper cross member 27.

A cylindrical canister 59 for adsorbing evaporated fuel occurring from the fuel tank 35 is disposed at an overlap portion which is located in the space surrounded by the throttle body 52 and the air cleaner case 61 and overlapped with the right and left main frames 17 in side view. As described above, the canister 59 is disposed in the space surrounded by the main frames 17, the throttle body 52 and the air cleaner case 61, and thus the canister 59 can be provided without affecting appearance.

Figure 3:
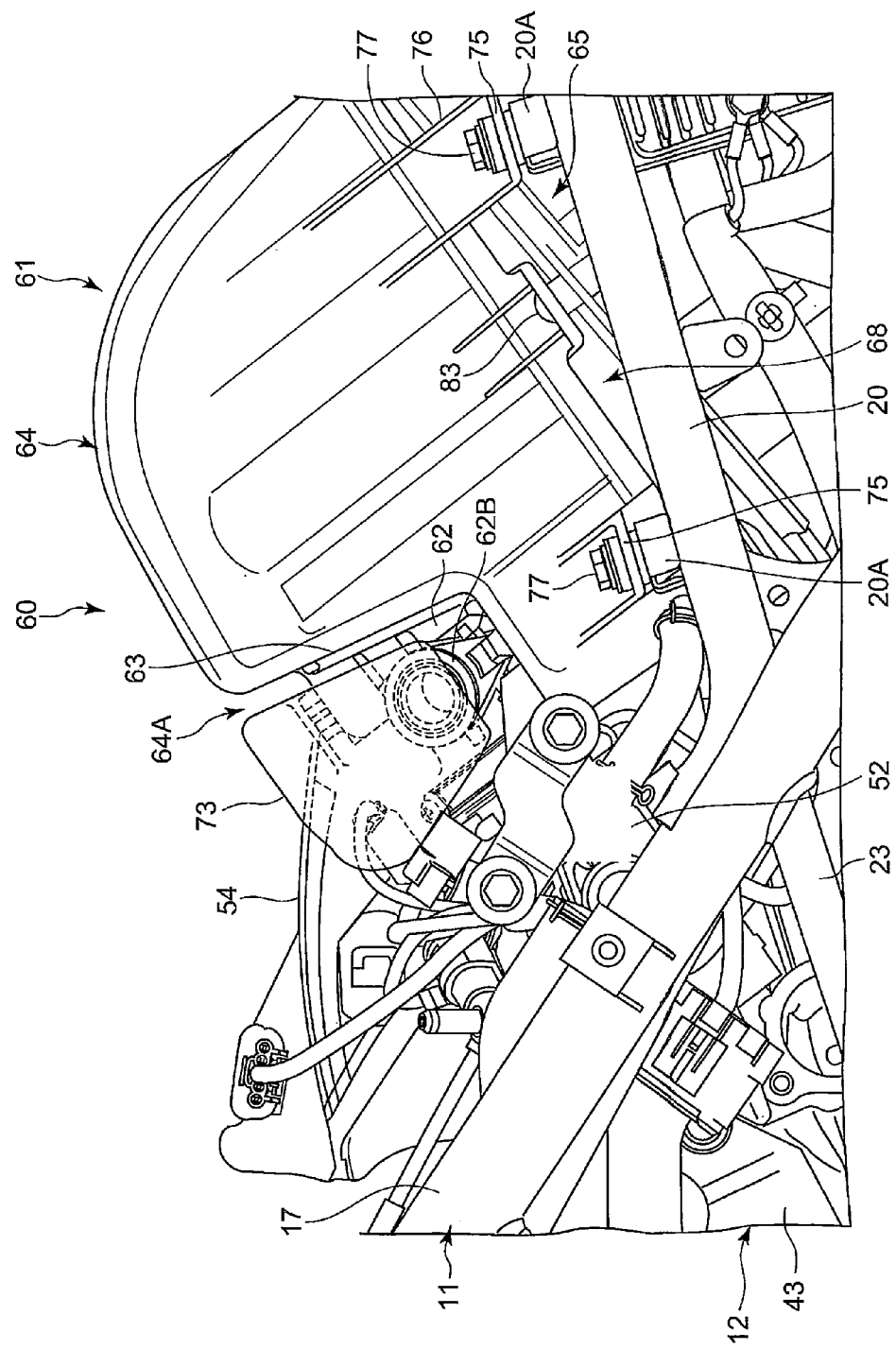
FIG. 3 is a side view showing the air-intake apparatus and the periphery thereof.
Figure 4:
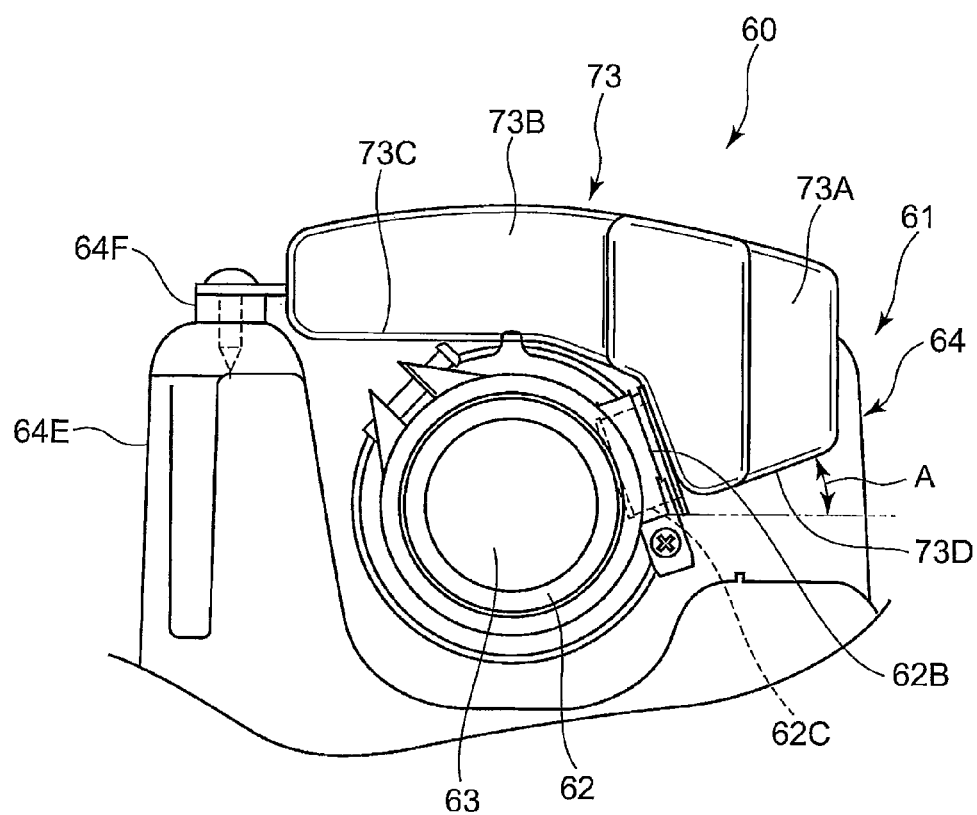
FIG. 4 is a front view of the upper portion of the air-intake apparatus when viewed from the front side.

FIG. 3 is a side view showing the air intake device 60 and the periphery thereof. Here, FIG. 3 shows a state that the fuel tank 35, the left-side side cover 54, etc. are detached. FIG. 4 is a front view of the upper portion of the air intake device 60 from the front side.

As shown in FIGS. 3 and 4, the connecting tube opening 63 is provided at the center in the width direction of the upper air cleaner case 64 at the step portion 64A, and a resonator connection portion 62B opened to the left side surface side is provided to the connecting tube 62. A side wall portion 64E covering the right side surface of the connecting tube 62 is formed at the opposite side to the resonator connection portion 62B at the front portion of the upper air cleaner case 64.

The resonator connection portion 62B is formed so as to be tilted upward with respect to the horizontal direction, and a resonator 73 is connected to the resonator connection portion 62B. The resonator 73 is a chamber for air which passes from the air cleaner case 61 through the connecting tube 62 and flows into the throttle body 52, and it has a function of reducing air intake sound.

The resonator 73 is disposed to be set in the step portion 64A, and it has a side chamber 73A swelling from the resonator connection portion 62B to the left side of the vehicle, and an upper chamber 73B which extends around to the upper portion of the connecting tube 62 and further extends till the neighborhood of the side wall portion 64E at the right side of the vehicle. The resonator 73 is fastened and fixed to a resonator fixing portion 64F provided to the upper surface of the side wall portion 64E.

As shown in FIG. 4, under the state that the vehicle is vertically upreared, the bottom surface 73C of the upper chamber 73B of the resonator 73 is substantially horizontal, and the bottom surface 73D of the side chamber 73A is tilted to the upper side of the outside in the vehicle width direction along the tilt of the resonator connection portion 62B. Furthermore, the bottom portion 62C on the inner surface of the resonator connection portion 62B and the bottom surface 73D of the side chamber 73A are continuous with each other, and are designed to have substantially the same tilt angle A. The tilt angle A is set to be larger than a predetermined angle at which the vehicle is tilted to the left side (the right side in FIG. 4) when the two-wheeled motor vehicle is parked by using the side stand 39. That is, even under the parking state using the side stand 39, the resonator connection portion 62B and the bottom surface 73D are kept under the state that the outside portions thereof are tilted upward. Accordingly, even when water droplets or the like occur in the resonator 73 under the parking using the side stand 39, the water droplets or the like flow to the connecting tube 62 side along the resonator connection portion 62B and the bottom surface 73D, and thus water, etc. are not stocked in the resonator 73.

As shown in FIG. 3, a case side fastening portion 75 for fixing the air cleaner case 61 to the vehicle body frame 11 is formed on the side surface of the upper air cleaner case 64. The case side fastening portion 75 is formed at one place of each of the front and rear portions on each of right and left side surfaces of the upper air cleaner case 64, and thus the case side fastening portions 75 are formed at totally four places. Each case side fastening portion 75 of the rear portion is formed at the end of a leg portion 76 extending downward from the side surface. The seating face of each case side fastening portion 75 is formed in parallel to the upper surface of the seat rail 20. Each case side fastening portion 75 is formed integrally with the upper air cleaner case 64 when the upper air cleaner case 64 is molded with resin. Therefore, each case side fastening portion 75 has high positional precision.

Furthermore, the frame side fastening portion 20A which is formed at the vehicle body frame 11 side in connection with the case side fastening portion 75 is provided at each of two places on the upper surface of each of the right and left seat rails 20, that is, provided totally at four places. When the air cleaner case 61 is assembled to the vehicle body frame 11, the air cleaner case 61 may be mounted on the seat rail 20, and the case side fastening portions 75 and the respective frame side fastening portion 20A may be fastened to each other by four bolts 77 which are tightened from the upper side. The air cleaner case 61 can be fixed by tightening the bolts 77 from the upper side of the seat rails 20 as described above, so that the assembling work can be facilitated and productivity can be enhanced.

Figure 5:
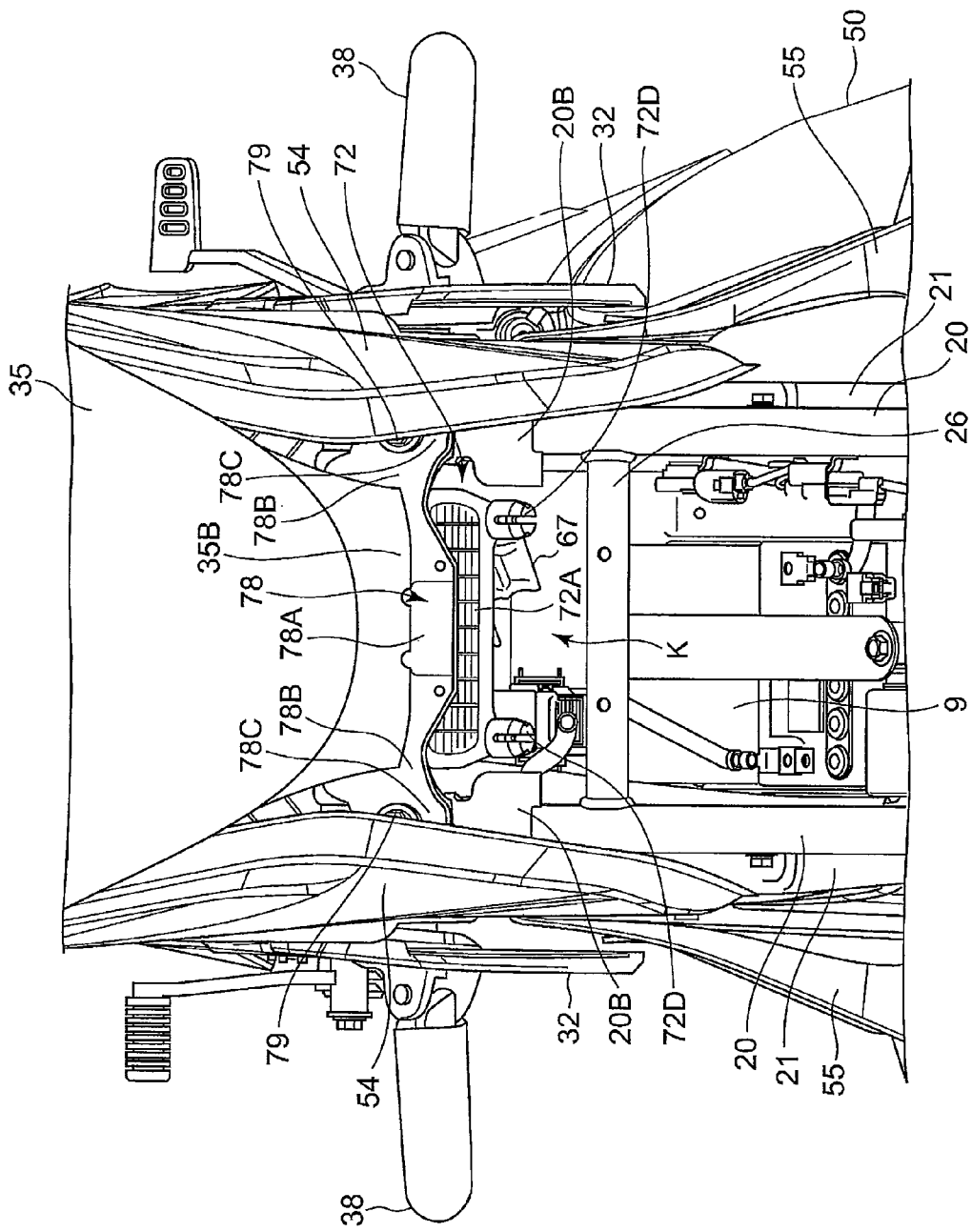
FIG. 5 is a plan view showing the periphery of a maintenance lid when viewed from the upper side.
Figure 6:
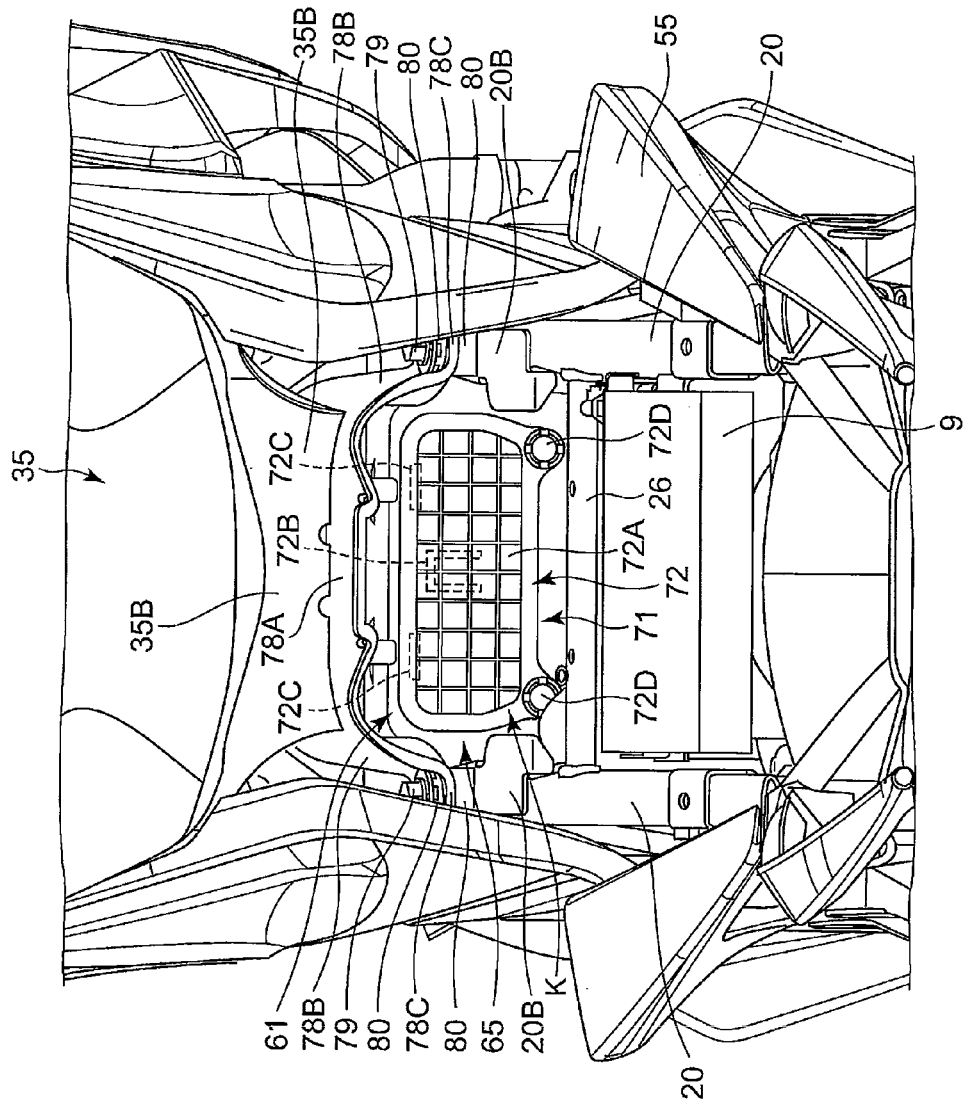
FIG. 6 is a view showing the periphery of the maintenance lid when viewed from a rear side position confronting the maintenance lid.

FIG. 5 is a plan view showing the periphery of the maintenance lid 72 when the periphery of the maintenance lid 72 is viewed from the upper side. FIG. 6 is a view showing the periphery of the maintenance lid 72 when the periphery of the maintenance lid 72 is viewed from a rear position facing the maintenance lid 72. Here, FIGS. 5 and 6 show a state that the seat 36 is detached.

As shown in FIGS. 2, 5 and 6, a plate-like stay fixing portion 35B projecting rearward from the rear portion is formed on the fuel tank 35, and the stay fixing portion 35B is located above the seat rails 20 and the side covers 54. A tank-side stay 78 (rear fastening portion) for fixing the fuel tank 35 to the seat rails 20 is fixed to the stay fixing portion 35B by welding.

As shown in FIG. 6, the tank-side stay 78 is designed in an arch-like shape so as to project upward in back view, and has a plate-like base portion 78A fixed to the rear end of the fuel tank 35 and arm portions 78B which extend downward from the right and left ends of the base portion 78A to the seat rails 20, respectively. The tank-side stay 78 is located above the maintenance lid 72, and covers the upper side of the maintenance lid 72.

A seating portion 78C obtained by folding the arm portion 78B outward in the width direction and flattening the folded portion is provided to the lower end of each arm portion 78B. Each of the right and left seating portions 78C extends to the upper surface of each seat rail 20 so as to burrow into the lower side of the side cover 54 projecting to the upper side of each seat rail 20. The fuel tank 35 is fixed to the seat rails 20 by tank fixing bolts which are inserted through the right and left seating portions 78C.

A plate-like frame side stay 20B is provided on the upper surface of each of the right and left seat rails 20. As shown in FIG. 6, the fuel tank 35 is rubber-mounted on the seat rails 20 by tightening the tank fixing bolts 79 at the right and left sides of the tank under the state that rubbers 80 are interposed between each of the right and left frame side stays 20B and the lower surface of the seating portion 78C and between the tank fixing bolt 79 and the upper surface of the seating portion 78C. Therefore, vibration among the right and left seat rails 20 and the fuel tank 35 can be reduced by the rubbers 80.

In this embodiment, the fuel tank 35 is fixed by using the arch-like tank-side stay 78 provided to the rear portion of the fuel tank 35, whereby a space K is secured at the rear side of the fuel tank 35 and below the tank-side stay 78 and the seat 36 which is continuous with the tank-side stay 78 and extends rearward. This space K is provided so as to face the maintenance opening 71 and the maintenance lid 72, and it is designed in such a size that the plate-like element 70 can be pulled out to the upper rear side or pushed into the lower front side along the normal line of the surface of the lid portion 72A of the maintenance lid 72 when the plate-like element 70 is mounted or dismounted through the maintenance opening 71.

As shown in FIG. 2, the lid portion 72A of the maintenance lid 72 is disposed to be tilted at such an angle that the lid portion 72A faces the back surface side of the seat 36. As shown in FIGS. 5 and 6, the lid portion 72A is formed to be smaller in width than the width between the right and left seat rails 20, and the lid portion 72A is disposed between the right and left seat rails 20. Furthermore, the lid fastening portions 72D are provided at both the ends in the width direction at the lower portion of the lid portion 72A. The lid fastening portions 72D are screw type fastening portions, and erected substantially vertically to the surface of the lid portion 72A.

As shown in FIG. 6, the lid-side guide portion 72B and the hook portions 72C are provided to the back surface side of the lid portion 72A. The lid-side guide portion 72B is located at the center in the width direction of the lid portion 72A, and the hook portions 72C are located at two places of both the end sides in the width direction of the lid portion 72A.

A seat lower cross member 26 is provided at the rear side of the maintenance lid 72, and the lid fastening portion 72D and the seat lower cross member 28 are arranged to have a predetermined positional relationship. Specifically, as shown in FIG. 2, the lid fastening portion 72D is disposed in such a positional relationship that the axial line T of the lid fastening portion 72D passes through the upper side of the seat lower cross member 26 and the axial line T does not interfere with the seat lower cross member 26. That is, as shown in FIG. 6, when the maintenance lid 72 is viewed from a rear side facing the lid portion 72A, the seat lower cross member 26 and the lid fastening portions 72D are not overlapped with each other, and the seat lower cross member 26 does not get in the way of the lid fastening portions 72D, so that the lid fastening portions 72D can be readily pulled out and detached in the direction of the axial line T.

Furthermore, since the maintenance opening 71 is located at a higher position than the axial line T, the plate-like element 70 does not impinge against the seat lower cross member 26 even when the plate-like element 70 is mounted/dismounted through the maintenance opening 71. Therefore, the plate-like element 70 can be readily mounted/dismounted through the space K. Furthermore, the space K does not accommodate any part which is overlapped with the plate-like element 70 when the plate-like element 70 is moved in the normal direction of the lid portion 72A from the maintenance opening 71.

As described above, according to this construction, the space K is secured below the tank-side stay 78 and the seat 36, and also the seat lower cross member 26 doest not hinder the mounting/dismounting of the lid fastening portions 72D and the plate-like element 70. Therefore, the maintenance of the plate-like element 70 can be easily performed. The space K is a space located below the seat 36, and no other part is disposed in the space K. Therefore, the height of the seat 36 can be reduced by the amount corresponding to a space for other parts which are not provided in the space K.

Furthermore, a battery 9 is disposed outside the space K at the rear side of the seat lower cross member 26.

The detailed construction of the air intake device 60 will be described hereunder.

Figure 7:
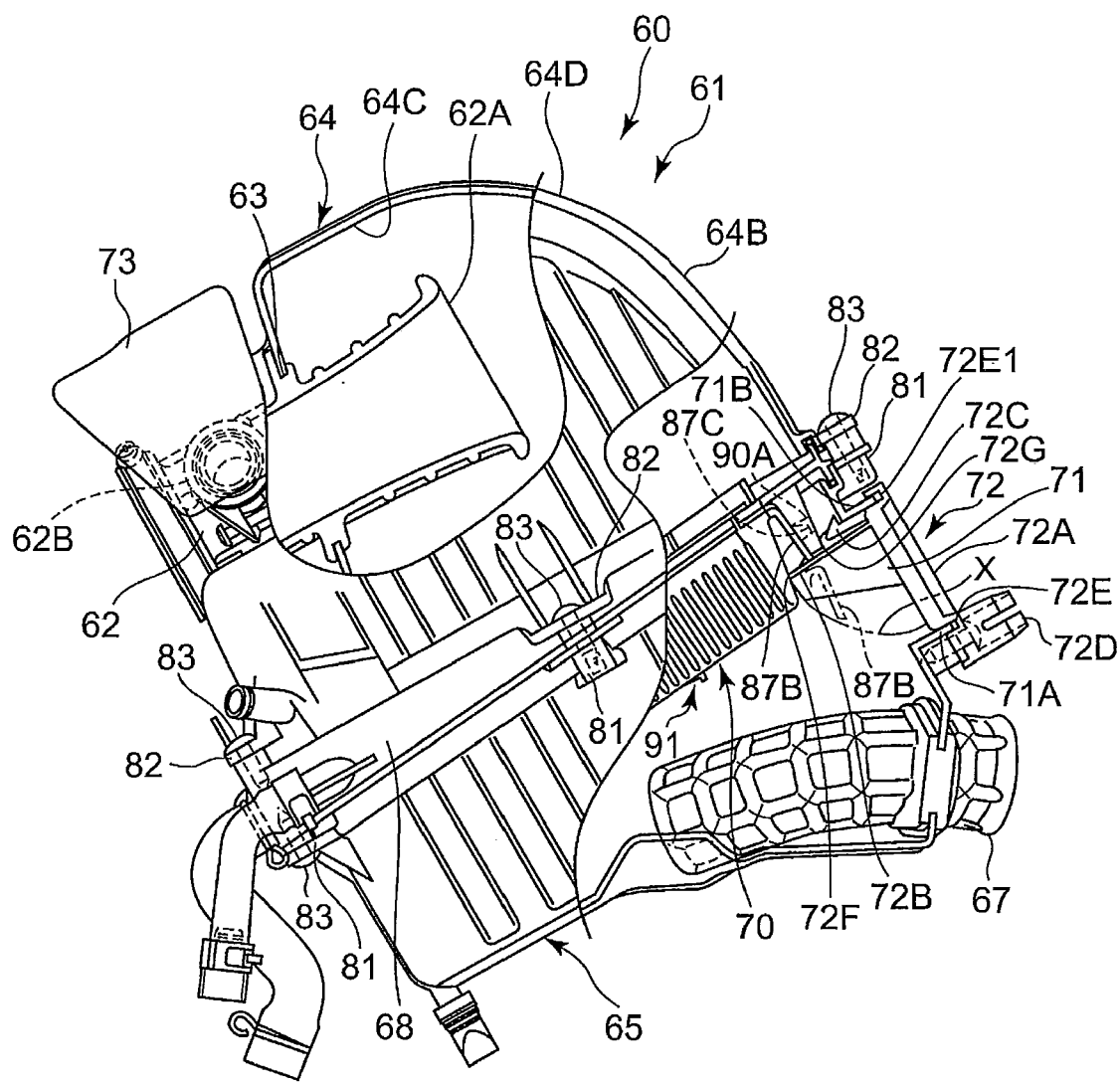
FIG. 7 is a partially cross-sectional side view of the air-intake apparatus.
Figure 8:
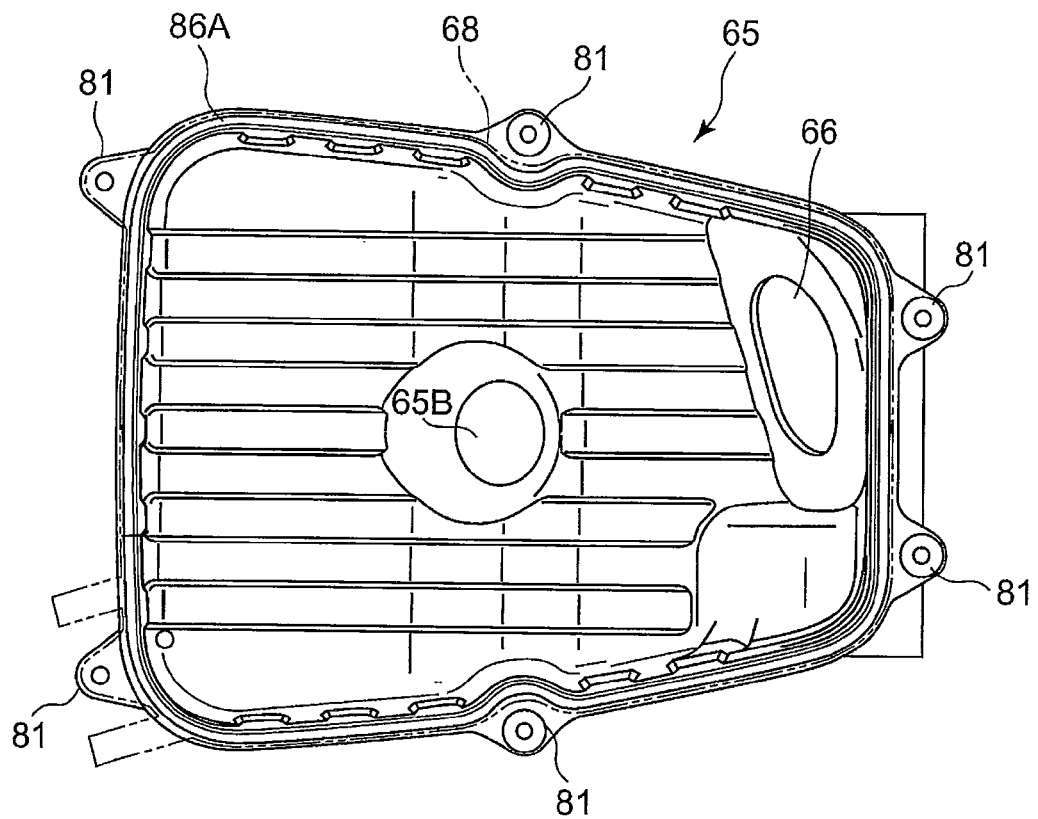
FIG. 8 is a plan view showing a lower air cleaner case.

FIG. 7 is a partially cross-sectional side view of the air intake device 60. FIG. 8 is a plan view showing the lower air cleaner case 65. Here, FIG. 8 shows the element holder 68 by a two-dotted chain line together with the lower air cleaner case 65.

As shown in FIG. 8, the lower air cleaner case 65 is formed to be substantially rectangular in plan view, and the width of the lower air cleaner case 65 is smaller as the position thereof approaches to the rear portion thereof. As indicated by the two-dotted chain line, the element holder 68 is designed to have substantially the same shape as the lower air cleaner case 65 in plan view, and secured to the upper portion of the lower air cleaner case 65.

As shown in FIGS. 7 and 8, plural lower case fixing portions 81 which project outward from the wall portion at the outer peripheral side of the lower air cleaner case 65 are formed on the upper portion of the lower air cleaner case 65. Furthermore, plural upper case fixing portions 82 are formed at the positions corresponding to the lower case fixing portions 81 on the wall portion at the outer peripheral side of the lower portion of the upper air cleaner case 64.

The air cleaner case 61 is assembled by tightening screws 83 for fastening the lower case fixing portions 81 and the upper case fixing portions 82 under the state that the element holder 68 is sandwiched between the lower air cleaner case 65 and the upper air cleaner case 64.

As shown in FIGS. 2 and 7, a lower surface convex portion 84 erected downward is provided to the outer edge portion of the lower surface of the element holder 68. An upper surface convex portion 85 erected upward is also provided to the outer edge portion of the upper surface of the element holder 68. The lower surface convex portion 84 and the upper surface convex portion 85 are formed over the whole periphery of the outer edge portion of the element holder 68.

A fitting groove 86A in which the lower surface convex portion 84 of the element holder 68 is fitted is formed at the upper edge portion of the lower air cleaner case 65. A fitting groove 86B in which the upper surface convex portion 85 of the element holder 68 is fitted is also formed at the lower edge portion of the upper air cleaner case 64.

As described above, the element holder 68 is assembled while the lower surface convex portion 84 and the upper surface convex portion 85 are fitted in the fitting grooves 86A and 86B respectively. Therefore, the element holder 68 can be surely positioned, and also sealing of the air cleaner case 61 can be enhanced.

Figure 9:
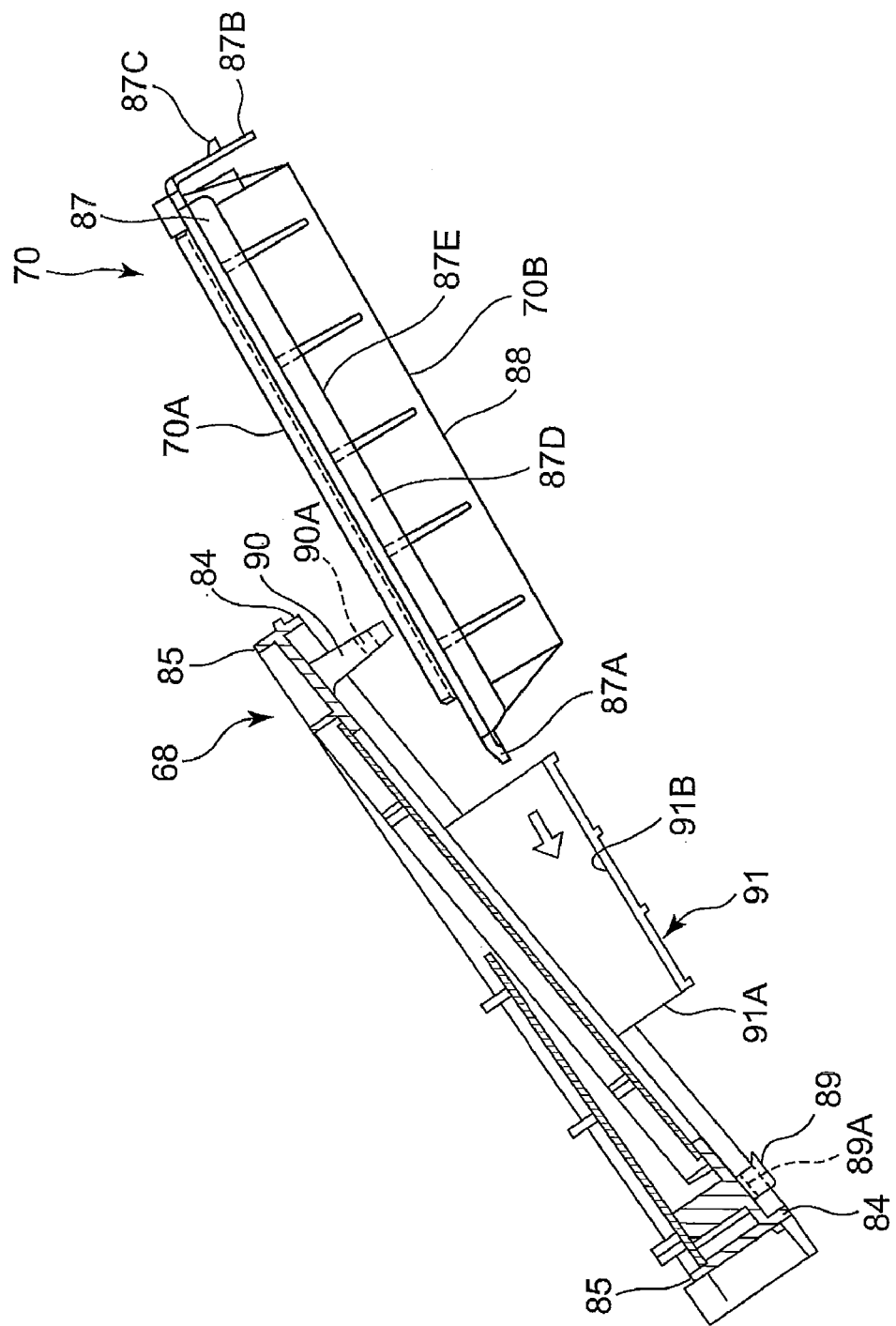
FIG. 9 is a side view of a plate-like element and an element holder.
Figure 10:
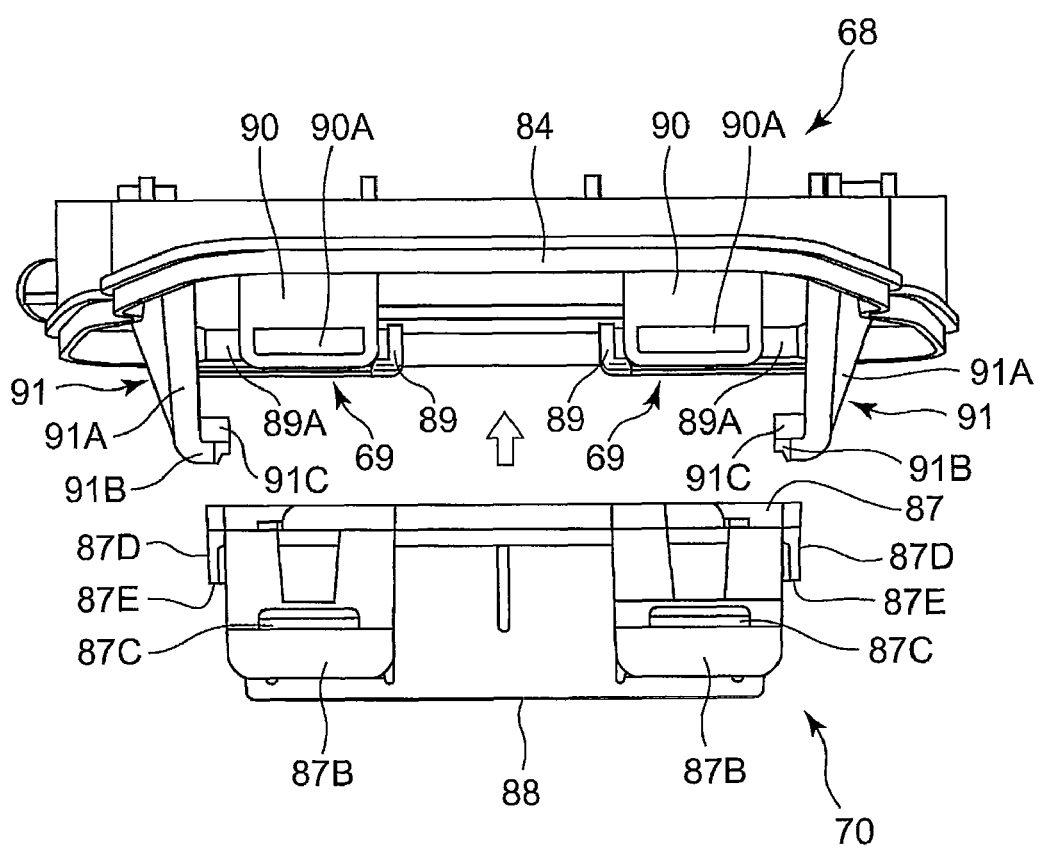
FIG. 10 is a view of the plate-like element and the element holder when viewed from a vehicle rear side.

FIG. 9 is a side view showing the plate-like element 70 and the element holder 6. FIG. 10 is a view showing the plate-like element 70 and the element holder 68 when they are viewed from the rear side of the vehicle.

As shown in FIGS. 2, 9 and 10, the plate-like element 70 has a plate-like frame portion 87 provided to the upper portion of the plate-like element 70, and a plate-like element body portion 88 which is provided so as to swell out downward from the frame portion 87.

A front projection 87A projecting forward is formed at the front end of the frame portion 87. The front projection 87A is provided at each of two places in the width direction of the plate-like element 70.

A plate-like flexible portion 87B which is formed by bending the rear end of the frame portion 87 downward is provided to the rear end of the frame portion 87, and a rear projection 87C projecting rearward is formed on the rear surface of the flexible portion 87B. The flexible portion 87B can sag forward when it is forward forced by press from the rear side or the like. As shown in FIG. 10, each of the flexible portion 87B and the rear projection 87C is provided at each of two places in the width direction of the plate-like element 70.

Furthermore, as shown in FIGS. 9 and 10, guide rails 87D projecting outward are formed on both the side surfaces in the width direction of the frame portion 87. The guide rails 87D are provided like rails so as to be continuous in the front-and-rear direction of the frame portion 87.

The element holder 68 has the element holding portions 69 at the lower surface side thereof, and the element holding portion 69 has a front fitting portion 89 projecting downward from the front end of the element holder 68, and a rear fitting portion 90 projecting downward from the rear end of the element holder 68.

A front hole portion 89A in which the front projection 87A of the plate-like element 70 is fitted is formed in the front fitting portion 89 of the element holder 68, and a rear hold portion 90A in which the rear projection 87C of the plate-like element 70 is fitted is formed in the rear fitting portion 90. As shown in FIG. 10, each of the front fitting portion 89 and the rear fitting portion 90 is provided at each of two places in the width direction of the element holder 68.

The element holder 68 has a downward projecting element guide portion 91 at the intermediate portion in the front-and-rear direction between the front projection 87A and the rear fitting portion 90. The element guide portion 91 is formed at a lower position than the position at which the plate-like element 70 is fixed, and it has a function of holding the plate-like element 70 when the plate-like element 70 is mounted/dismounted.

As shown in FIG. 10, a pair of right and left element guide portions 91 are provided in the width direction, and they have extension portions 91A extending downward from the right and left end portions of the element holder 68, and guide portions 91B formed by bending the respective lower ends of the extension portions 91A inwardly in the width direction. The guide portions 91B extend in the front-and-rear direction while tilted rearward and upward, and the tilt angle thereof is set to be smaller than the tilt angle of the plate-like element 70 as shown in FIG. 2.

The guide portion 91B of the element holder 68 is a portion for receiving the guide rail 87D of the plate-like element 70. That is, the plate-like element 70 which is set so as to pass between the right and left element guide portions 91 is pushed into the element holder 68 while the lower surfaces 87E of the guide rails 87D slide on the upper surfaces 91c of the guide portions 91B.

The front projections 87A are fitted in the front hole portions 89A of the front fitting portions 89 of the element holder 68 and then pushed up to a fixing position by the lid-side guide portion 72B of the maintenance lid 72, and the rear projections 87C of the flexible portions 87B are fitted in the rear hole portions 90A of the rear fitting portions 90, whereby the plate-like element 70 pushed in the element holder 68 can be fixed. Specifically, the plate-like element 70 is pushed up by the lid-side guide portion 72B under the state that the front projections 87A are fitted in the front hole portions 89A of the front fitting portions 89, and it turns upward around the front hole portions 89A and reaches the fixing position. At this fixing position, the plate-like element 70 is pushed against the front fitting portions 89 by the tip 72F of the lid-side guide portion 72B, and also pushed against the lower surface of the element holder 68 by the upper surface portion 72G of the lid-side guide portion 72B. Accordingly, the plate-like element 70 can be brought into close contact with the element holder 68, and the dirty side and the clean side can be surely hermetically sealed from each other.

As shown in FIG. 7, the maintenance lid 72 is secured so as to be turned around the groove portion 72E1 under the state that the groove portion 72E1 at the upper portion of the maintenance lid 72 is hooked to the upper portion 71B of the fixing portion 71A of the maintenance opening 71. Therefore, when the maintenance lid 72 is secured, the tip of the lid-side guide portion 72B moves upward as if it draws an arcuate locus as indicated by a locus X in FIG. 7.

The position of the flexible portion 87B of the plate-like element 70 which has been guided by the element guide portion 91 and pushed into the element holder 68 is inside the locus X as indicated by a two-dotted chain line in FIG. 7, and overlapped with the turning range of the lid-side guide portion 72B. That is, the plate-like element 70 is pushed up by the lid-side guide portion 72B when the maintenance lid 72 is attached, whereby the plate-like element 70 is set up at the fixing position. Accordingly, the plate-like element 70 can be fixed at the same time when the maintenance lid 72 is attached.

Furthermore, when the flexible portion 87B is pushed up by the lid-side guide portion 72B, the rear projections 87C comes into contact with the rear fitting portions 90, whereby the flexible portions 87B bend forward. When the plate-like element 70 is further pushed up to fit the rear projections 87C into the rear hole portions 90A, the flexible portions 87B are turned to the original state.

Furthermore, the upper portion of the maintenance lid 72 is fixed when the hook portions 72c are hooked to the inner wall 66B of the upper portion of the air intake duct opening 66, and thus a fastening portion using a screw or the like can be eliminated.

Here, the procedure of mounting/dismounting the plate-like element 70 will be described with reference to FIGS. 2, 7, 9 and 10.

When the plate-like element 70 is mounted, the lock mechanism of the seat 36 described above is first released to dismount the seat 36, and the maintenance lid 72 is disposed to the outside through the space K. Subsequently, a hand is inserted into the space K to release the fastening of the lid fastening portions 72D and remove the lid fastening portions 72D and the maintenance lid 72. Subsequently, the plate-like element 70 is inserted from the maintenance opening 71 to set the plate-like element 70 in the element holder 68 . At this time, the plate-like element 70 is straightly guided in the direction of an arrow of FIG. 9 because the guide rails 87D are positionally regulated by the guide portions 91B, and thus the front projections 87A are surely fitted into the front hole portions 89A. Therefore, the plate-like element 70 can be surely and simply set to an exact position.

Furthermore, by mounting the maintenance lid 72 at the maintenance opening 71, the plate-like element 70 is pushed to the fixing position by the lid-side guide portion 72B, and the rear projections 87C are fitted in the rear hole portions 90A, whereby the plate-like element 70 can be perfectly fixed. Thereafter, the lid fastening portions 72D may be tightened, and the seat 36 may be mounted.

When the plate-like element 70 is dismounted, the maintenance lid 72 is first detached according to the same procedure as the mounting work. Subsequently, the flexible portions 87B located inside the maintenance opening 71 are pressed to release the fitting between the rear projections 87C and the rear hole portions 90A. When the fitting between the rear projections 87C and the rear hole portions 90A is released, the plate-like element 70 falls under its own weight, and it falls to a position at which it is held by the element guide portions 91. Thereafter, the plate-like element 70 is pulled out from the maintenance opening 71 through the space K, whereby the plate-like element 70 can be dismounted. At this time, the guide rails 87D are guided to the space K side by the guide portions 91B, so that the plate-like element 70 can be smoothly pulled out.

According to this embodiment, the maintenance opening 71 and the maintenance lid 72 are provided so as to face the front portion of the seat 36, and also the space K is provided between the maintenance lid 72 and the seat 36. Therefore, by dismounting the seat, the maintenance lid 72 and the plate-like element 72 are allowed to be mounted and dismounted through the space K, whereby maintenance can be easily performed. Here, the state that the maintenance lid 72 faces the seat 36 means that the normal line of the surface of the lid portion 72A is overlapped with at least a part of the seat 36 in side view. That is, the plate-like element 72 may be merely mounted/dismounted through the space K along the normal line of the surface of the lid portion 72A, and it is unnecessary that the maintenance lid 72 perfectly faces the seat 36.

As described above, according to the embodiment to which the present invention is applied, the plate-like element 70 is disposed to be tilted rearward and upward, whereby the size of the plate-like element 70 does not affect the size in the height direction of the air cleaner case 61. Therefore, the air cleaner case 61 can be disposed compactly in the height direction. Accordingly, the air cleaner case 61 can be disposed to be proximate to the engine 12 in accordance with the demand characteristic of the engine 12, and also the height of the seat 36 above the air cleaner case 61 can be reduced. Furthermore, the maintenance lid 72 is provided so as to face the seat 36 at the rear side of the fuel tank 35. Therefore, even when the air cleaner case 61 is disposed in proximity to the engine 12, the fuel tank 35 does not hinder, so that the plate-like element 70 can be dismounted from the seat 36 side for maintenance with neither displacing nor dismounting the fuel tank 35, and thus the maintenance performance can be enhanced. Furthermore, only the space K which the maintenance lid 72 faces is formed below the seat 36, and thus the height of the seat 36 can be reduced, so that steering performance can be enhanced.

Furthermore, under the state that the seat 36 is mounted, the maintenance lid 72 is located below the seat 36, and thus it is not viewed from the outside, so that the appearance can be enhanced.

The plate-like element 70 is disposed in the lower air cleaner case 65 of the air cleaner case 61 which is constructed by the upper and lower divisional cases. Therefore, when the plate-like element 70 is mounted/dismounted, dust adhering to the plate-like element 70 can be prevented from dropping to the side of the upper air cleaner case 64, that is, the clean side, and thus the maintenance performance can be enhanced. Furthermore, the maintenance lid 72 is disposed at the side of the lower air cleaner case 65, that is, the dirty side into which outside air is introduced. Therefore, the air-tightness between the maintenance lid 72 and the lower air cleaner case 65 can be relatively easily managed, so that productivity can be enhanced.

Furthermore, when the plate-like element 70 is inserted or pulled out through the maintenance lid 72, the plate-like element 70 can be guided to the right position by using the element guide portions 91 of the element holder 68, and thus the mounting/dismounting performance of the plate-like element 70 can be enhanced.

Furthermore, when the maintenance lid 72 is fixed to the maintenance opening 71, the plate-like element 70 is pushed up by the lid-side guide portion 72B and thus the plate-like element is also simultaneously fixed, so that the maintenance performance can be fixed. Furthermore, when the maintenance lid 72 is detached, the plate-like element 70 is allowed to drop by its own weight until it reaches the position at which it is held by the element guide portions 91, so that the plate-like element 70 can be easily pulled out.

Still furthermore, the hook portions 72c are provided to the upper portion of the maintenance lid 72, and the upper portion of the maintenance lid 72 is not fixed by any fastening portion or the like. Therefore, The maintenance lid 72 can be mounted at the maintenance opening 71 while turned with groove portion 72E1 of the maintenance lid 72 being used as fulcrums, so that the plate-like element 70 can be pushed up by the lid-side guide portions 72B, so that the plate-like element 70 can be pushed up to the fixing position. Furthermore, the hook portions 72C are provided to the upper portion of the maintenance lid 72, so that it is not required to provide any fastening part to the upper portion and thus the number of parts of the fastening parts can be reduced. Therefore, the productivity can be enhanced, and the weight saving can be performed.

All the fastening portions of the air cleaner case 61 to the seat rails 20 are provided as the case-side fastening portions 75, and the case-side fastening portions 75 are formed integrally with the upper air cleaner case 64. Therefore, the position precision of each cases-side fastening portion 75 can be enhanced, and the productivity can be enhanced. Furthermore, the air cleaner case 61 can be assembled by tightening the case-side fastening portions 75 from the upper side of the seat rails 20, so that the assembling work can be facilitated and the productivity can be further enhanced.

Furthermore, the wall portion of the upper air cleaner case 64 on which air intake negative pressure of the engine 12 acts is designed as the spherical wall portion 64D to increase the rigidity of the wall portion, so that the air intake sound caused by the vibration of the wall portion can be reduced.

Still furthermore, the arch-like tank-side stay 78 is provided to the stay fixing portion 35B at the rear side of the fuel tank 35, and thus the space K through which the maintenance lid 72 and the plate-like element 70 can pass can be secured at the rear side of the fuel tank 35. Furthermore, the tank-side stay 78 also functions as a member for connecting a pair of right and left seat rails 20, and thus the strength and rigidity of the seat rails 20 can be enhanced.

The above embodiment is an example to which the present invention is applied, and the present invention is not limited to the above embodiment.

In the above embodiment, the air cleaner case 62 is constructed by the two upper and lower divisional cases, and has the upper air cleaner case 64 and the lower air cleaner case 65. However, the present invention is not limited to this style. For example, the plate-like element 70 may be provided in the integrally formed air cleaner case, the air cleaner case may be disposed so that the plate-like element 70 is tilted rearward and upward, and the maintenance lid provided to the rear portion of the air cleaner case may be provided so as to face the seat 36. Furthermore, it is needless to say that the detailed construction of the two-wheeled motor vehicle may be arbitrarily modified.

DESCRIPTION OF REFERENCE NUMERALS

10 two-wheeled motor vehicle
11 vehicle body frame
12 engine (internal combustion engine)
20 seat rail (frame member)
20A frame-side fastening portion
35 fuel tank
36 seat
61 air cleaner case
61A, 61B divisional face
62 connecting tube
63 opening for connecting tube
64 upper air cleaner case
64B rear wall portion (wall portion)
65 lower air cleaner case
66 opening for air intake duct
68 element holder
70 plate-like element
70A upper cleaning face (cleaning face)
70B lower cleaning face (cleaning face)
72 maintenance lid
72B lid-side guide portion
72C hook portion
72D lid fastening portion (fastening portion)
75 case-side fastening portion
78 tank-side stay (rear fastening portion)
91 element guide portion
WF front wheel
WR rear wheel

The invention claimed is:

1. A two-wheeled motor vehicle having a vehicle body frame for holding a front wheel so that the front wheel is steerable, and holding a rear wheel so that the rear wheel is swingable, a fuel tank disposed at a front upper side of the vehicle body frame, a seat disposed behind the fuel tank and above the vehicle body frame, an internal combustion engine suspended between the lower side of the fuel tank and the lower side of the vehicle body frame, an air cleaner case for cleaning intake outside air and supplying the air to the internal combustion engine, a plate-like element disposed inside the air cleaner case, and a maintenance lid that constitutes a part of the air cleaner case and used when the plate-like element is mounted/dismounted, characterized in that the internal combustion engine is a four-cycle engine in which a cylinder axis is tilted forward; the air cleaner case is disposed at a rear side of a cylinder head provided to the upper portion of the cylinder and below the fuel tank and constructed by two vertically divisional cases of an upper air cleaner case formed at a clean side and a lower air cleaner case formed at a dirty side, and an air intake duct of the air cleaner case is provided below the maintenance lid; the plate-like element is disposed to be tilted rearward and upward in a side view of the vehicle so that a cleaning face thereof faces an up-and-down direction; and the maintenance lid is provided below the seat so as to face the seat so that the plate-like element can be pulled out by detaching the seat.

2. The two-wheeled motor vehicle according to claim 1, wherein an opening for a connecting tube for supplying intake air to the internal combustion engine is formed in the upper air cleaner case, an opening for an air intake duct for introducing outside air into the air cleaner case is formed in a lower air cleaner case, and the plate-like element and the maintenance lid are arranged in the lower air cleaner case.

3. The two-wheeled motor vehicle according to claim 2, wherein an element holder is interposed between divisional faces of the upper air cleaner case and the lower air cleaner case, and an element guide portion for holding the plate-like element is formed at a lower portion of the element holder.

4. The two-wheeled motor vehicle according to claim 3, wherein the element guide portion is foamed at a lower side of a position at which the plate-like element is fixed, a lid-side guide portion projecting to the inside of the air cleaner case is formed in the maintenance lid, and the lid-side guide portion is formed so as to push up the plate-like element to a fixing position under the state that the maintenance lid is fixed to the air cleaner case.

5. The two-wheeled motor vehicle according to claim 4, wherein the maintenance lid has a hook portion at an upper portion thereof, and has a fastening portion at a lower portion thereof.

6. The two-wheeled motor vehicle according to claim 2, wherein all case-side fastening portions for fixing the air cleaner case to the vehicle body frame are formed in the upper air cleaner case, and a frame-side fastening portion at the side of the vehicle frame to which the air cleaner case is fixed is disposed on the upper surface of the vehicle body frame.

7. The two-wheeled motor vehicle according to claim 2, wherein a wall portion of the upper air cleaner case that faces a connecting tube connected to the opening for the connecting tube is formed in a spherical shape.

8. The two-wheeled motor vehicle according to claim 1, wherein the vehicle body frame comprises at least a pair of right and left frame members, and the fuel tank has a rear fastening portion that is formed in an arch-like shape in back view at a rear portion thereof, and is fixed to the pair of right and left frame members through both the end portions in the vehicle width direction of the rear fastening portion.

9. The two-wheeled motor vehicle according to claim 3, wherein all case-side fastening portions for fixing the air cleaner case to the vehicle body frame are formed in the upper air cleaner case, and a frame-side fastening portion at the side of the vehicle frame to which the air cleaner case is fixed is disposed on the upper surface of the vehicle body frame.

10. The two-wheeled motor vehicle according to claim 4, wherein all case-side fastening portions for fixing the air cleaner case to the vehicle body frame are formed in the upper air cleaner case, and a frame-side fastening portion at the side of the vehicle frame to which the air cleaner case is fixed is disposed on the upper surface of the vehicle body frame.

11. The two-wheeled motor vehicle according to claim 5, wherein all case-side fastening portions for fixing the air cleaner case to the vehicle body frame are formed in the upper air cleaner case, and a frame-side fastening portion at the side of the vehicle frame to which the air cleaner case is fixed is disposed on the upper surface of the vehicle body frame.

12. The two-wheeled motor vehicle according to claim 3, wherein a wall portion of the upper air cleaner case that faces a connecting tube connected to the opening for the connecting tube is formed in a spherical shape.

13. The two-wheeled motor vehicle according to claim 4, wherein a wall portion of the upper air cleaner case that faces a connecting tube connected to the opening for the connecting tube is formed in a spherical shape.

14. The two-wheeled motor vehicle according to claim 5, wherein a wall portion of the upper air cleaner case that faces a connecting tube connected to the opening for the connecting tube is formed in a spherical shape.

15. The two-wheeled motor vehicle according to claim 6, wherein a wall portion of the upper air cleaner case that faces a connecting tube connected to the opening for the connecting tube is foamed in a spherical shape.

16. The two-wheeled motor vehicle according claim 2, wherein the vehicle body frame comprises at least a pair of right and left frame members, and the fuel tank has a rear fastening portion that is formed in an arch-like shape in back view at a rear portion thereof, and is fixed to the pair of right and left frame members through both the end portions in the vehicle width direction of the rear fastening portion.

17. The two-wheeled motor vehicle according to claim 3, wherein the vehicle body frame comprises at least a pair of right and left frame members, and the fuel tank has a rear fastening portion that is formed in an arch-like shape in back view at a rear portion thereof, and is fixed to the pair of right and left frame members through both the end portions in the vehicle width direction of the rear fastening portion.

18. The two-wheeled motor vehicle according to claim 4, wherein the vehicle body frame comprises at least a pair of right and left frame members, and the fuel tank has a rear fastening portion that is formed in an arch-like shape in back view at a rear portion thereof, and is fixed to the pair of right and left frame members through both the end portions in the vehicle width direction of the rear fastening portion.

19. The two-wheeled motor vehicle according to claim 5, wherein the vehicle body frame comprises at least a pair of right and left frame members, and the fuel tank has a rear fastening portion that is formed in an arch-like shape in back view at a rear portion thereof, and is fixed to the pair of right and left frame members through both the end portions in the vehicle width direction of the rear fastening portion.

20. The two-wheeled motor vehicle according to claim 6, wherein the vehicle body frame comprises at least a pair of right and left frame members, and the fuel tank has a rear fastening portion that is formed in an arch-like shape in back view at a rear portion thereof, and is fixed to the pair of right and left frame members through both the end portions in the vehicle width direction of the rear fastening portion.

* * * * *